United States Patent [19]

Åsberg

[11] Patent Number: 4,564,243
[45] Date of Patent: Jan. 14, 1986

[54] HUB BEARING UNIT

[75] Inventor: Sture L. Åsberg, Gothenburg, Sweden

[73] Assignee: SKF Nova AB, Gothenburg, Sweden

[21] Appl. No.: 470,220

[22] Filed: Feb. 28, 1983

[30] Foreign Application Priority Data

Mar. 29, 1982 [SE] Sweden ................................ 8201969

[51] Int. Cl.$^4$ .......................... B60B 37/00; B62D 7/06; F16C 33/00
[52] U.S. Cl. .................. 301/124 R; 301/126; 180/259
[58] Field of Search ............... 301/124 R, 124 H, 126, 301/105 R, 125; 180/258, 259, 70.1, 73.3, 73.4; 308/190, 191; 464/178, 906

[56] References Cited

U.S. PATENT DOCUMENTS

| | | | |
|---|---|---|---|
| 4,150,553 | 4/1979 | Aucktor ........................... | 464/906 X |
| 4,352,528 | 10/1982 | Guimbretiere .................. | 180/258 X |
| 4,396,236 | 8/1983 | Asberg ............................. | 308/191 X |
| 4,437,536 | 3/1984 | Colanzi et al. .................. | 301/126 X |

FOREIGN PATENT DOCUMENTS 2511950  3/1982  France ............................. 301/105 R Primary Examiner—Robert B. Reeves
Assistant Examiner—Russell D. Stormer
Attorney, Agent, or Firm—Eugene E. Renz, Jr.

[57] ABSTRACT

The invention refers to a hub bearing unit for vehicles, trailers and the like incorporating two rows (4) of rolling bodies with a common outer ring (5). On the outer race ring (5) is arranged a flange (6) for mounting the unit and arranged symmetrically relative to the rows of rolling bodies (4). The flange (6) is provided with attachments holes (7) and lugs (8) adjacent these, whereby the side surfaces of the lugs (8) are in level with the side (10) of the outer race ring (5), which shall engage the attachment surface of the vehicle, the trailer or the like.

2 Claims, 2 Drawing Figures

HUB BEARING UNIT

BACKGROUND OF THE INVENTION

The present invention refers to a hub bearing unit intended for mounting of driven or non-driven wheels on vehicles, trailers and similar devices.

Hub bearing units of the above type are earlier known. These bearing units replace shaft and bearing for supporting the vehicle wheels. The units, which incorporate rolling bodies and therefore are to be considered as bearings themselves, are mounted on the vehicle, whereas the wheel is mounted on the rotating part of the units. Units of this type are described i.a. in British Patent Specification No. 1,358,842 and German Pat. No. 3,018,172.

In above British Patent Specification is shown a unit for driven as well as non-driven wheels. The unit comprises two rows of balls which have a common outer race ring with a flange for attachment to the vehicle. This flange, as can be seen, is located non-symmetrically in relation to the rows of balls. This causes problems regarding roundness of the outer race ring at heat treatment thereof and that the stress distribution from the attachment bolts and the stress distribution during operation will be different on the two rows of balls.

The above German Patent in contrast thereto shows a device similar to that described in the British Patent where however the attachment flange on the outer race ring is arranged symmetrically in relation to the rows of balls. A drawback with the device according to this patent is that it is necessary to use moulded steering knuckle housings to which the units are to be mounted. This is of course a drawback from cost aspects. The attachment flange must, as can be seen, be made very high and it is therefore space requiring and expensive to manufacture.

It always has been a desire to be able to use stamped steering knuckle housings for attachment of the hub bearing units. The unit shown in the German Patent cannot be used in connection with such steering knuckle housings as the parts of the housing, which will be located inside the bolts will be too weak. The length of the screws would not be sufficient for a reliable friction joint.

SUMMARY OF THE INVENTION

According to the present invention the problem present at the two above mentioned hub bearing units has been solved and it has been provided a unit, which incorporates inner race ring with means for mounting of a wheel, outer race ring with flange for mounting the unit to a vehicle, a trailer or the like and two rows of rolling bodies disposed between the outer race ring and the inner race ring and which unit is characterized thereby, that the flange on the outer race ring is arranged on the centre of the outer race ring symmetrically in relation to the rows of rolling bodies and that it is provided with attachment holes and lugs adjacent these, whereby the side surfaces of the lugs are in level with the side of the outer race ring, which shall engage the attachment surface of the vehicle, the trailer or the like.

The hub bearing unit, which can be intended also for driven wheels, can be designed thus that it incorporates one half of a drive joint.

DESCRIPTION OF THE DRAWINGS

The invention will hereinafter be further described with reference to the accompanying drawings in which.

BRIEF DESCRIPTION OF THE PREFERRED EMBODIMENT

Figure 1:
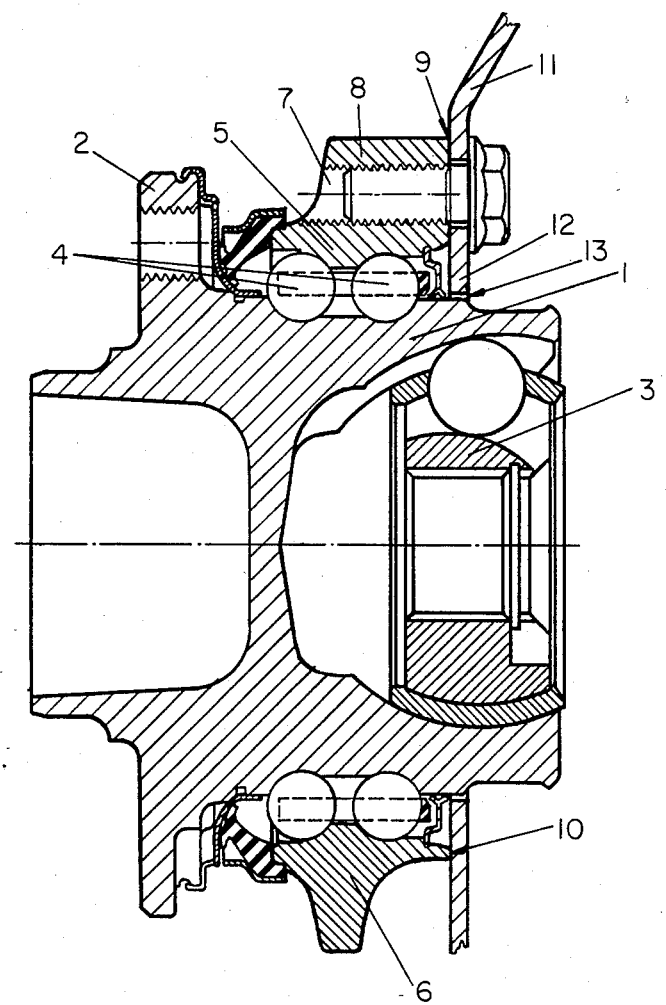
FIG. 1 shows a cross section through the unit according to the invention.

FIG. 1 shows a hub bearing unit for driven wheels. It incorporates an inner race ring 1, which is provided with a flange 2 for rigid mounting of a wheel. In the inner race ring 1 there is arranged one half 3 of a drive joint. In the unit there are two rows of rolling bodies 4 and outside these an outer race ring 5. On this outer race ring 5 a flange 6 is symmetrically arranged between the rows of balls 4. In the flange 6 are drilled bolt holes 7 for attachment of the unit to the vehicle. The flange 6 is at the bolt holes 7 provided with lugs 8. The end 9 of the lugs 8 are as can be seen arranged aligned in the same radial plane as the axial end face 10 of the outer race ring which shall bear against the attachment part of the vehicle. The bolt holes will hereby be long, which is necessary for bringing about a reliable screw joint. The attachment unit of the vehicle is in the drawing made as a stamped steering knuckle housing 11. This steering knuckle housing can now at its lower end 12 be extended very much, which is necessary from strength aspects and can form a labyrinth seal 13 against the inner race ring 1. An additional protection for the ball rows besides the common seal is thereby obtained.

Figure 2:
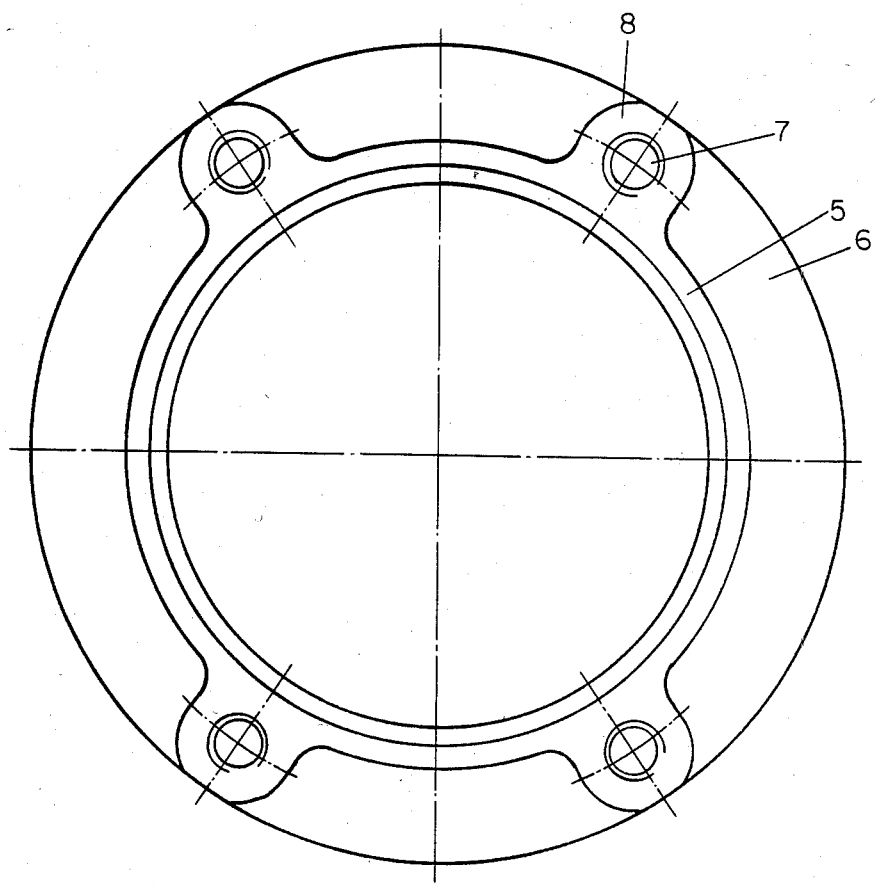
FIG. 2 shows the outer race ring of the same unit as seen from the side.

FIG. 2 shows the outer race ring of the unit in FIG. 1 as seen from the side. The outer race ring 5 is as can be seen provided with a flange 6. In the flange 6 there are arranged four bolt holes 7. These are provided with lugs 8. The tangential extension of the lugs 8 can be made small, whereby dimension changes after heat treatment are more easily avoided.

The space between the lugs 8 on the flange 6 can be used for attachment of brake parts etc. This is not further shown in the figure.

By means of the present invention a hub bearing unit is obtained which has an outer race ring, which is dimension permanent after heat treatment and which can be mounted to stamped steering knuckle housings, which are cheap to manufacture and which at the same time can form a labyrinth seal with the inner race ring. It is also obtained the best possible stress distribution in the material resulting from the forces emanating from the attachment bolts and the forces which during operation arise from the two rows of balls and a low flange which requires little space. These advantages are of big commercial and technical value.

The invention is not limited to the embodiment shown but can be varied in different manners within the scope of the appended claims.

I claim:

1. A hub unit for vehicles comprising an inner race ring (1) having means for mounting to a wheel of a vehicle, an outer race ring (5) having a radially directed flange (6) formed integrally therewith for mounting the hub unit to the vehicle and two axially spaced rows of rolling elements (4) mounted in the annular space between the raceways of the inner and outer race rings, said flange (6) being disposed in a plane through the axial center of the outer race ring and symmetrical relative to the rows of rolling elements a plurality of circumferentially spaced lugs (8) having axially extending through holes (7) for fasteners to secure the hub unit to a steering knuckle housing (11), one axial end face of the lugs aligned radially with an axial end face of the outer race ring, said housing having a radial wall portion contacting an outer axial end face of the outer ring and closely circumscribing the inner race ring to form with said inner ring a labyrinth seal.

2. Hub bearing unit according to claim 3, characterized thereby that the inner race ring (1) is designed thus, that it incorporates one half (3) of a drive joint.

* * * * *